United States Patent
Choate et al.

(10) Patent No.: US 6,224,834 B1
(45) Date of Patent: *May 1, 2001

(54) SILANE OXIDATION EXHAUST TRAP

(75) Inventors: Charles A. Choate, Underhill; Michael R Lunn, Milton, both of VT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,628

(22) Filed: Apr. 16, 1998

(51) Int. Cl.[7] ............................ B01D 53/00; B01D 53/46; B01D 53/34

(52) U.S. Cl. .................... 422/171; 422/169; 422/170; 422/172; 422/173

(58) Field of Search ........................... 422/168–173, 422/187–191, 198; 55/DIG. 10, DIG. 12, 485–487, 361, 342–343, 346, 350.1, 419, 385.2, 383; 423/337

(56) References Cited

U.S. PATENT DOCUMENTS

| | | | |
|---|---|---|---|
| 4,801,437 | 1/1989 | Konagaya et al. | 423/336 |
| 4,923,687 | 5/1990 | Schork et al. | 423/245.1 |
| 5,042,249 * | 8/1991 | Erdmannsdoerfer | 422/171 |
| 5,250,323 | 10/1993 | Miyazaki | 118/715 |
| 5,320,817 | 6/1994 | Hardwick et al. | 423/237 |
| 5,405,445 | 4/1995 | Kumada et al. | 422/168 |
| 5,443,644 | 8/1995 | Ozawa | 118/715 |
| 5,505,752 | 4/1996 | Burrous et al. | 55/385.5 |
| 5,509,948 | 4/1996 | Keller et al. | 95/268 |
| 5,632,964 | 5/1997 | Ishii et al. | 423/245.1 |
| 5,873,919 * | 2/1999 | Vross et al. | 55/DIG. 10 |

FOREIGN PATENT DOCUMENTS

| | | |
|---|---|---|
| 60-13071 | 1/1985 | (JP) . |
| 8-035417 | 2/1996 | (JP) . |
| WO 96/16720 * | 6/1996 | (WO) . |

OTHER PUBLICATIONS

Q.J. carbone et al. (1983) "High Conductance Particle Collector" *IBM Technical Disclosure Bulletin* 26(4): 1969–1971,

* cited by examiner

*Primary Examiner*—Hien Tran
(74) *Attorney, Agent, or Firm*—Scully, Scott, Murphy & Presser; James M. Leas

(57) ABSTRACT

An oxidation exhaust trap for filtering a particulate product of a first gas contacted with a gaseous oxidizing agent. The oxidation exhaust trap has a vessel having an interior cavity. The vessel further having a first inlet in communication with the interior cavity for introduction of the first gas into the interior cavity and a second inlet in communication with the interior cavity for introduction of the gaseous oxidizing agent into the interior cavity, the gaseous oxidizing agent mixing with the first gas thereby causing oxidation of the first gas for producing the particulate product suspended in a gaseous product. Lastly, the vessel has an outlet in communication with the interior cavity. A filter is disposed in the interior cavity for filtering the particulate product from the gaseous product which is exhausted through the outlet. In a preferred embodiment of the present invention, the first gas is silane and the gaseous oxidizing agent is air. Other aspects of the present invention are methods for filtering a particulate product of a first gas contacted with a gaseous oxidizing agent and a system for the same.

11 Claims, 7 Drawing Sheets

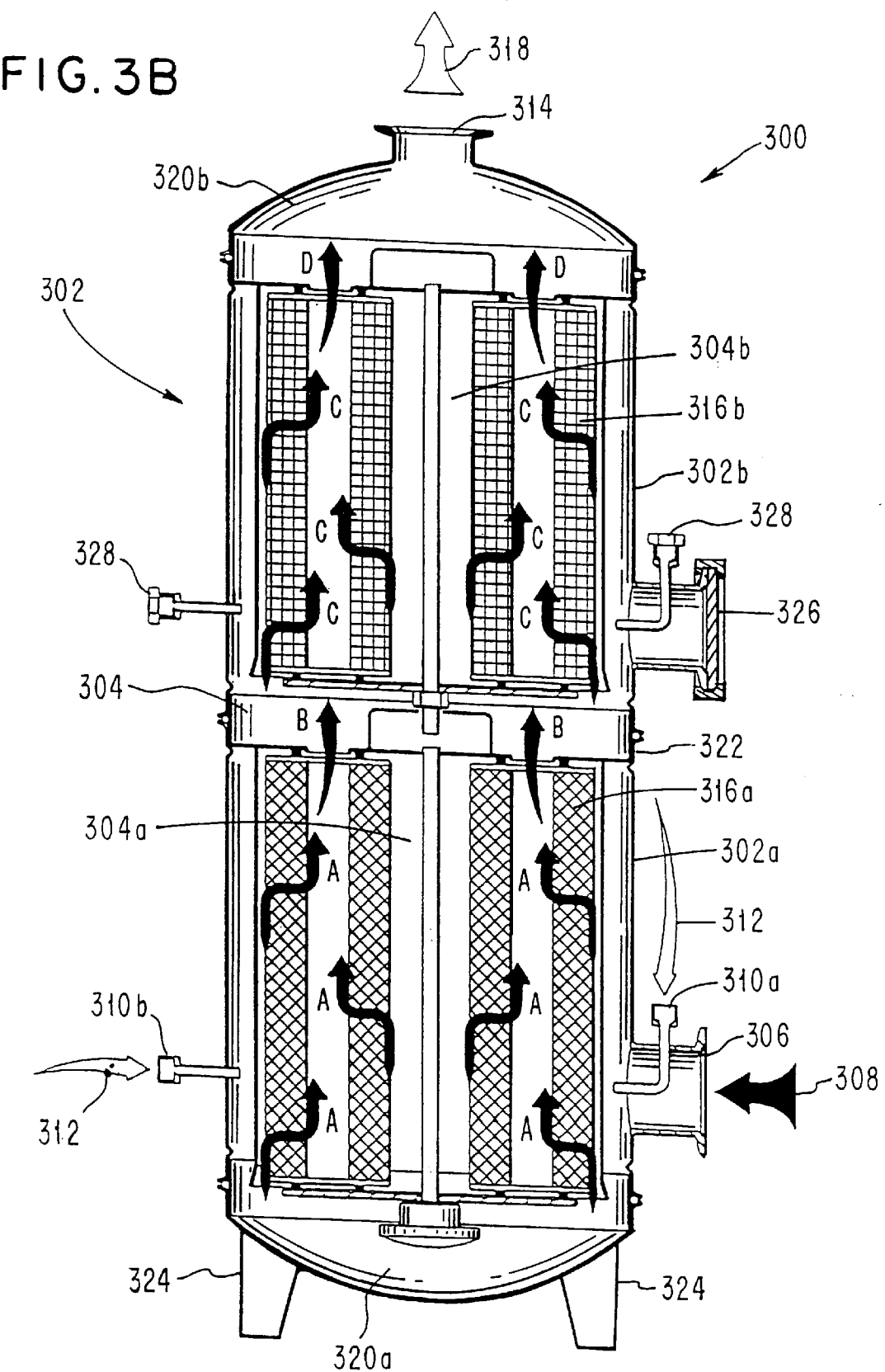

SILANE OXIDATION EXHAUST TRAP

BACKGROUND OF THE INVENTION

1. Field of the Invention

This invention relates to an oxidation exhaust trap for filtering a particulate product of a first gas contacted with a gaseous oxidizing agent. More specifically, this invention relates to an oxidation exhaust trap for filtering silica resulting from the oxidation of silane with air.

2. Description of the Related Art

Exhaust gases which contain silane and must be subjected to cleaning are being produced today in many branches of industry, as for example in the production of silicon compounds, in the packing of silicon compounds, in the production and bottling of silane-containing gas mixtures, and in the production of semiconductors.

Conventional methods of disposal, such as scrubbing, burning, or washing in wash towers present great problems with regard to the expense, maintenance, and complexity of the equipment necessary to carry out these methods.

Of these methods, scrubbing the gases containing the silane is most popular. While this method has its benefits, it requires complex and expensive apparatus. Furthermore, the maintenance of the scrubber caused by the silane containing gases is very costly and time consuming. The silane tends to clog the scrubber's exhaust system filters. Thus to maintain the scrubber properly, the filters need to be cleaned periodically. Making matters worse is that the processes which feed the scrubber, including those which produce the silane gas, must be shut down while the maintenance is performed.

SUMMARY OF THE INVENTION

Therefore, it is an object of the present invention to provide an exhaust trap for filtering a particulate product of a gas which is inexpensive to operate, fabricate, and maintain.

It is another object of the present invention to provide a lightweight exhaust trap for filtering a particulate product of a gas.

It is yet another object of the present invention to provide an exhaust trap for filtering a particulate product of a gas which operates at room temperature.

Accordingly, a first embodiment of an oxidation exhaust trap for filtering a particulate product of a first gas contacted with a gaseous oxidizing agent is provided. The oxidation exhaust trap comprises a vessel having an interior cavity, a first inlet in communication with the interior cavity for introduction of the first gas into the interior cavity, and a second inlet in communication with the interior cavity for introduction of the gaseous oxidizing agent into the interior cavity, the gaseous oxidizing agent mixing with the first gas thereby causing oxidation of the first gas for producing the particulate product suspended in a gaseous product. The vessel further having an outlet in communication with the interior cavity. A filter is disposed in the interior cavity for filtering the particulate product from the gaseous product which is then exhausted through the outlet.

In a second embodiment of the present invention an oxidation exhaust trap for filtering a particulate product of a first gas contacted with a gaseous oxidizing agent is provided. The oxidation exhaust trap comprises a vessel having an interior cavity. The interior cavity has a first and a second part in communication with each other. A first inlet is provided which is in communication with the first part of the interior cavity for introduction of the first gas into the first part of the interior cavity. A second inlet is provided which is in communication with the first part of the interior cavity for introduction of the gaseous oxidizing agent into the first part of the interior cavity, the gaseous oxidizing agent mixing with the first gas. The mixing of the first gas with the oxidizing agent causes the oxidation of the first gas in the first part of the interior cavity, wherein the particulate product is produced suspended in a gaseous product. The vessel also has an outlet in communication with the second part of the interior cavity. A first filter is disposed in the first part of the interior cavity for filtering the particulate product of a predetermined size from the gaseous product. A second filter is disposed in the second part of the interior cavity for filtering the remaining particulate product from the gaseous product which is then exhausted through the outlet.

In a preferred version of the first and second embodiments of the oxidation exhaust trap of the present invention, the first gas is silane, the particulate product is silica, and the gaseous oxidizing agent is air.

In yet another preferred version of the first and second embodiments, the vessels are arranged in series wherein the filters disposed in their respective vessels filter successively smaller particulates from the gaseous product before the gaseous product is exhausted through the outlet of the last vessel in the series.

Other aspects of the present invention are methods for filtering a particulate product of a first gas contacted with a gaseous oxidizing agent and a system for the same.

BRIEF DESCRIPTION OF THE DRAWINGS

These and other features, aspects, and advantages of the present invention will become better understood with regard to the following description, appended claims, and accompanying drawings where:

FIG. 3B illustrates a sectional view of the oxidation exhaust trap of FIG. 3A taken along line 3B—3B;

FIG. 4 illustrates a sectional view of the oxidation exhaust trap of FIG. 1B taken along line 4—4 of;

DETAILED DESCRIPTION OF THE PREFERRED EMBODIMENTS

Figure 1A:
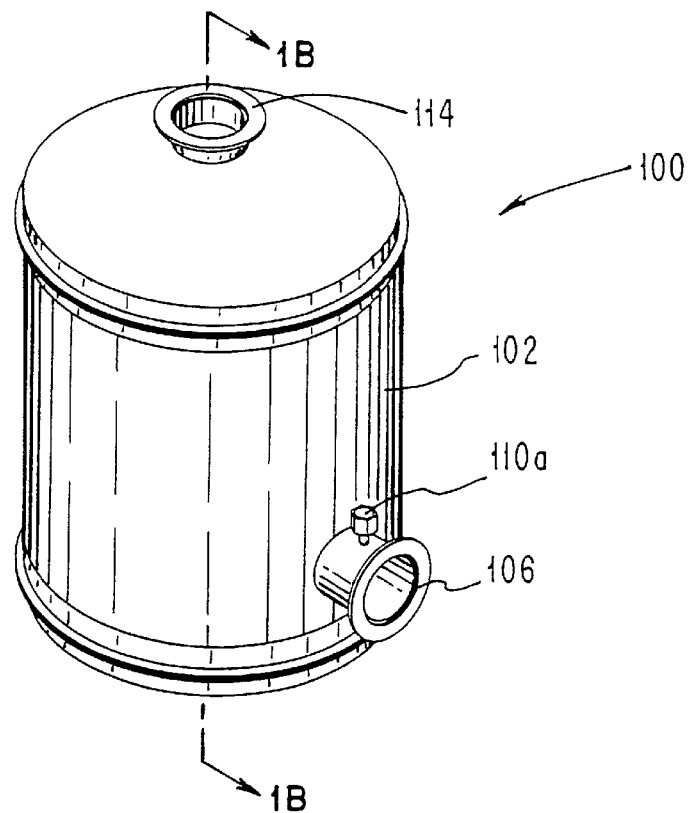
FIG. 1A illustrates an isometric view of the oxidation exhaust trap of the present invention.
Figure 1B:
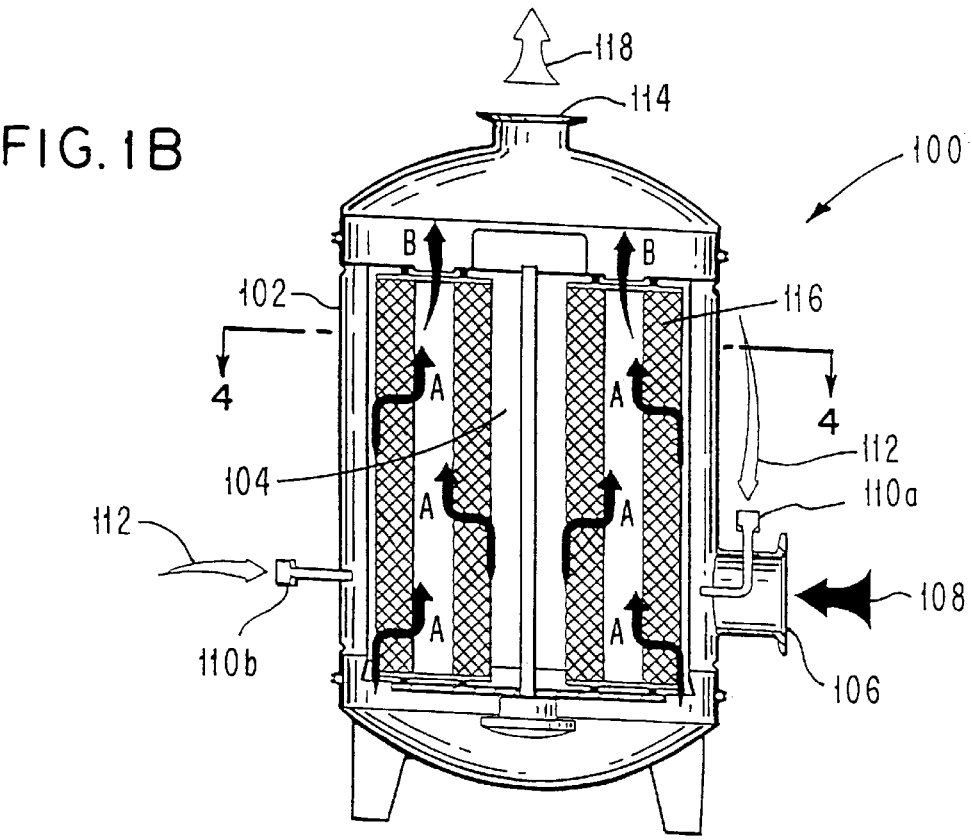
FIG. 1B illustrates a sectional view of the oxidation exhaust trap of FIG. 1A taken along line 1B—1B.

Referring now to FIGS. 1A and 1B, there is illustrated an embodiment of an oxidizing exhaust trap of the present invention, generally referred to by reference numeral 100. The oxidation exhaust trap 100 filters a particulate product of a first gas contacted with a gaseous oxidizing agent. Preferably, the first gas is silane, its particulate product is silica, however other pyrophoric/oxidizable gases can be used, such as phosphine. The oxidizing agent is preferably oxygen, or an oxygen containing gas, such as air. Furthermore, the air is generally compressed to facilitate its mixing with the silane.

The oxidation exhaust trap 100 comprises a vessel 102 having an interior cavity 104. The exhaust trap 100 also comprises a first inlet 106 in communication with the interior cavity 104 for introduction of the first gas 108 into the interior cavity 104 and a second inlet 110a in communication with the interior cavity 104 for introduction of the gaseous oxidizing agent 112 into the interior cavity 104, the gaseous oxidizing agent mixes with the first gas 108 thereby causing oxidation of the first gas 108 and producing a particulate product suspended in a gaseous product. Preferably, the vessel 102 also has a third inlet 110b in communication with the interior cavity 104 and opposing the second inlet 110a for also introducing the oxidizing agent 112 into the interior cavity 104 and to facilitate the mixing of the oxidizing agent 112 with the first gas 108.

The oxidation of the first gas 108 caused by its mixing with the oxidizing agent 112 produces the particulate product. An outlet 114 in communication with the interior cavity 104 is also provided. Lastly, at least one filter 116 is disposed in the interior cavity 104 between the inlets 106, 110a, 110b and the outlet 114 for filtering the particulate product from the gaseous product 118 which is then exhausted through the outlet 114. Any type of filter can be used with a pore size smaller than the particulates to be filtered. Preferably the filter has a pore size smaller than the smallest particulates to the filtered. With silane, it has been found that 100% of the resulting silica particulates can be filtered from the gaseous product with a filter having a pore size of 2 microns. Furthermore, a polypropylene media filter has been found to perform best as well as being the most economical.

Figure 4:
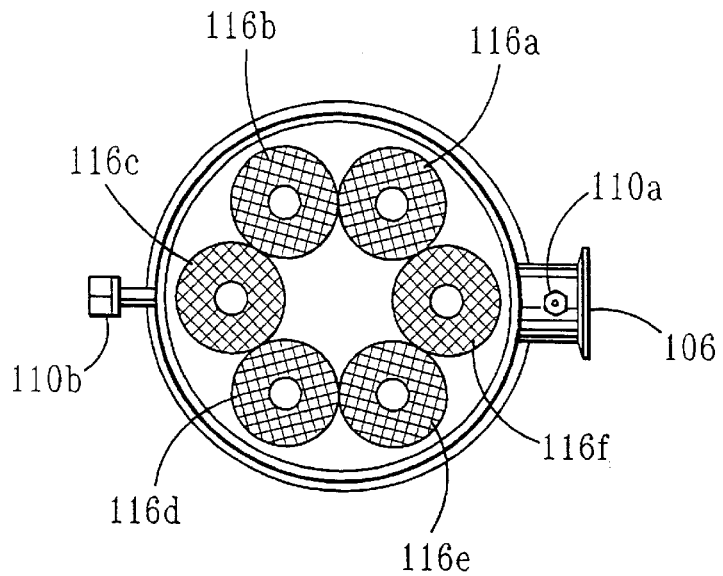

The filter 116 can be a single filter having a cylindrical shape, or preferably the filter 116 can be made up of several cylindrical filters 116a–116f arranged as shown in FIG. 4. In this arrangement, the cost, and maintenance of the six smaller filters 116a–116f is far less than a single large filter.

Figure 5:
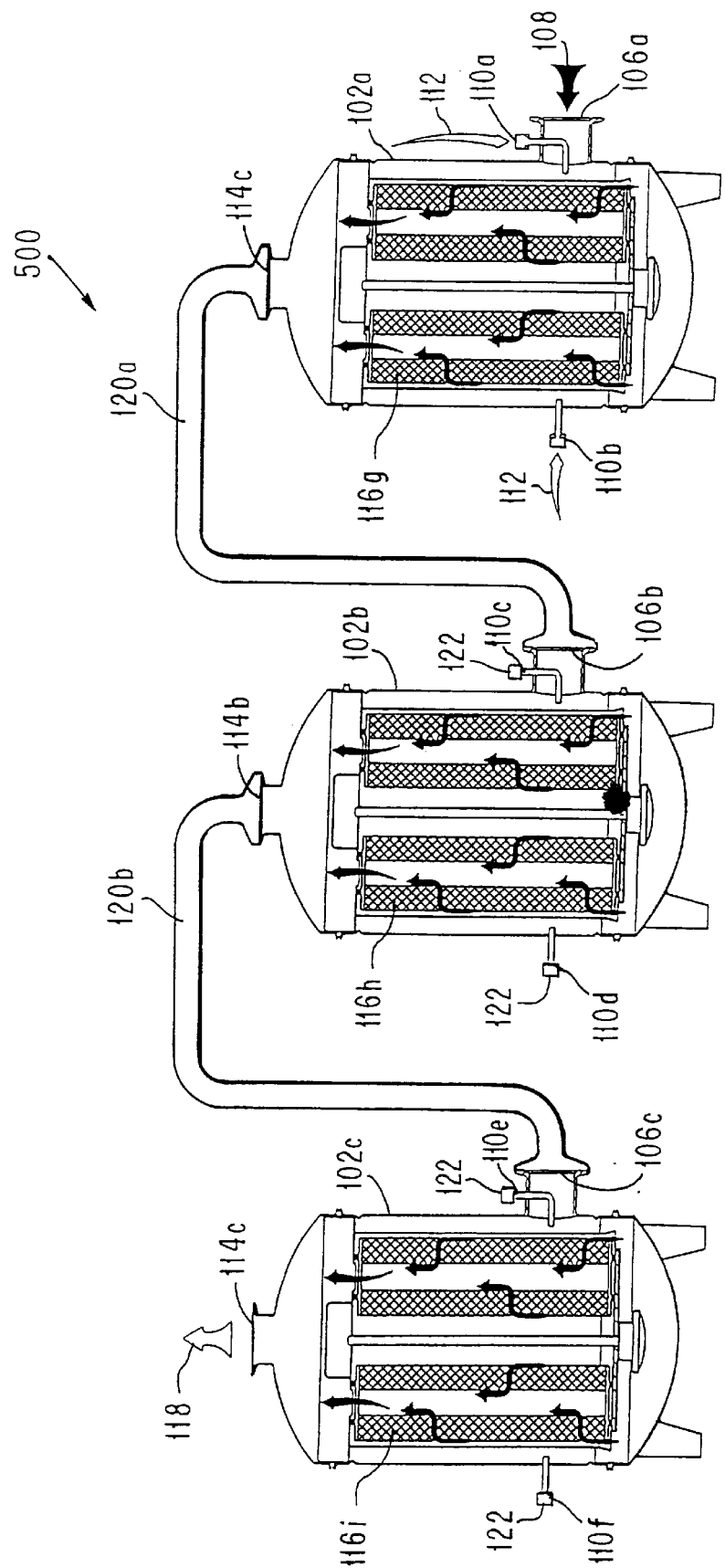
FIG. 5 illustrates a plurality of oxidation exhaust traps of the present invention connected in series.

Alternatively, a plurality of oxidation exhaust traps 100 can be arranged in series, shown in FIG. 5, and referred to generally by reference numeral 500. The exhaust trap 500 is arranged having a plurality of vessels 102a, 102b, 102c having first inlets 106a, 106b and 106c, respectively. The vessels 102a, 102b, 102c are connected by ducting 120a, 120b such that the outlets 114a, 114b of all but the last vessel act as first inlets and where the second and third inlets 110c, 110d, 110e, 110f of all but the first vessel are capped with plugs 122. The outlet 114c of the last vessel 102c in the series is for the exhaust of the gaseous product and the filters 116g, 116h, 116i disposed in the vessels 102a, 102b, 102c, respectively, filter successively smaller particulates from the first vessel 102a to the last vessel 102c.

Preferably the oxidation exhaust trap has more than one filter stage for successively filtering smaller particulates from the gaseous product. The embodiment shown in FIGS. 2A and 2B, and generally referred to by reference numeral 200, uses a two filter stage system. The first filter stage 216a being disposed in a first part 204a of the interior cavity 204 of the vessel 202 and the second filter stage 216b being disposed in a second part 204b of the interior cavity 204. The inlets 206, 210a, 210b being in communication with the first part 204a of the interior cavity 204 and the outlet 214 being in communication with the second part 204b of the interior cavity 204.

The first filter stage 216a filters the particulate product having a predetermined size and the second filter stage 216b preferably filters the remaining particulate product. The remaining gaseous product 218 of the oxidation is then exhausted through the outlet 214. If silane is the first gas, the first stage filter 216a is preferably a stainless steel mesh, or other coarse filter media having a pore size of 50 microns, and the second filter stage 216b has a pore size of 2 microns for removal of all remaining particulates.

While the oxidizing exhaust trap 200 is shown and described with one or two filters stages 216a, 216b it should be obvious to someone skilled in the art that more than two filter stages may be used without departing from the spirit and scope of the invention. The double filter stage configuration illustrated in FIGS. 2A and 2B and described above has advantages over the single filter stage configuration illustrated in FIGS. 1A and 1B. For instance, the first filter stage 216a prevents the more expensive second filter stage 216b from clogging with large particulates making the two filter stage system more economical in terms of replacement cost, maintenance, and downtime.

Additionally, the filters, once clogged, can either be disposed of and replaced, or cleaned and reused. If the first gas 108 contains trace amounts of contaminants, such as arsenic, which are environmentally hazardous, then it is preferable to clean the filters of the particulate product and dispose of the contaminated particulate product in a proper fashion.

Figure 2A:
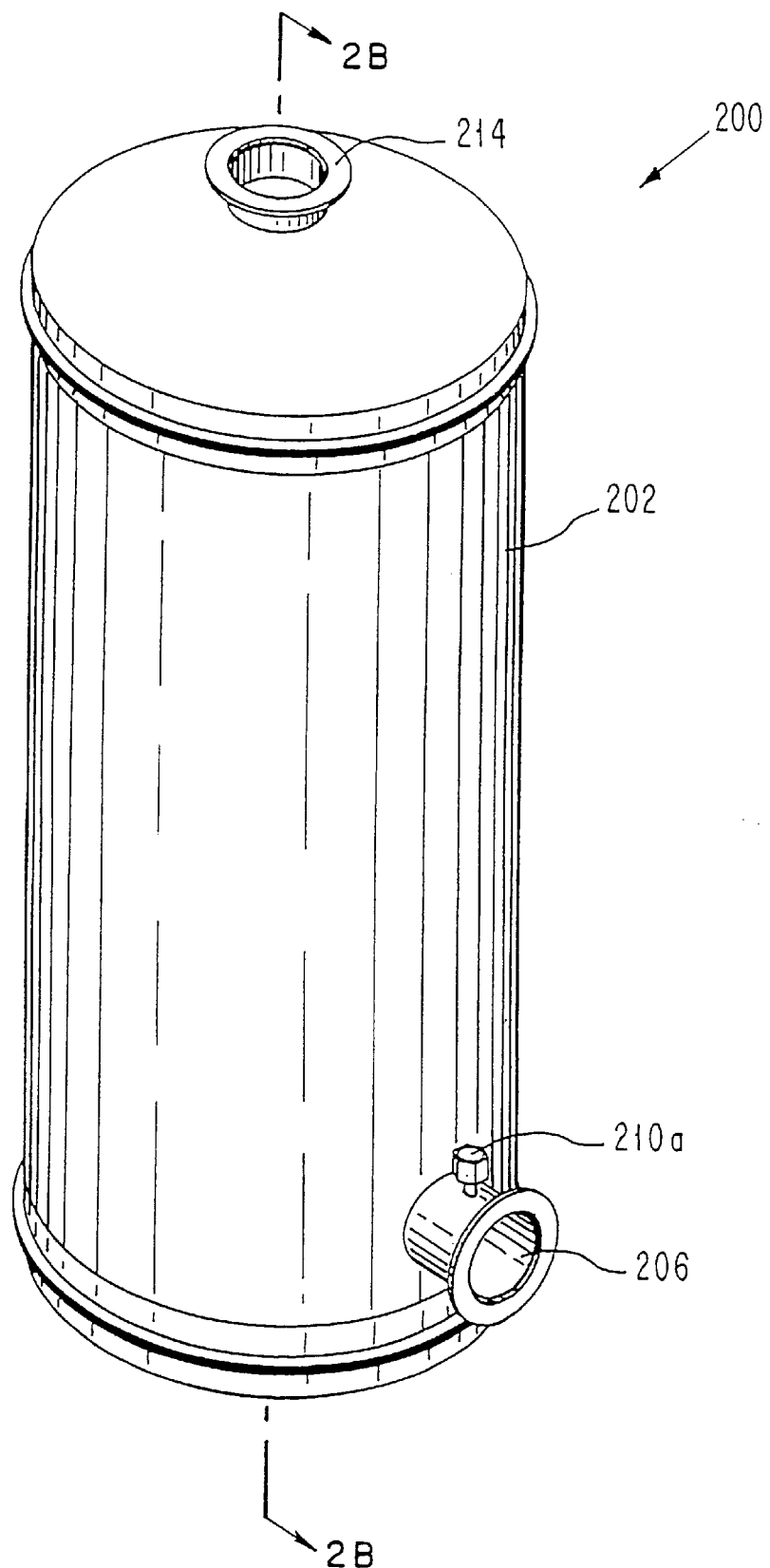
FIG. 2A illustrates an isometric view of an alternative version of the oxidation exhaust trap of the present invention.
Figure 2B:
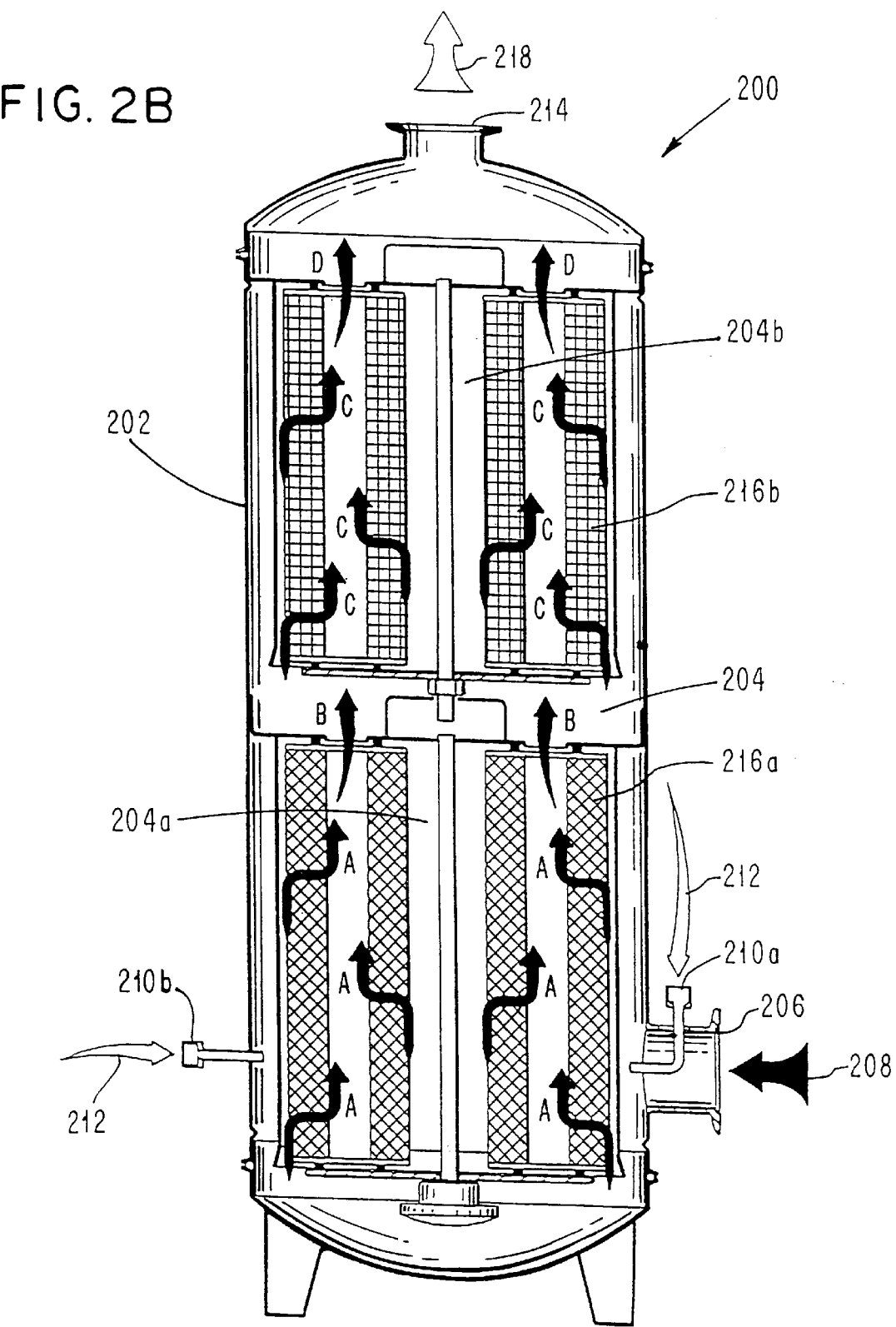
FIG. 2B illustrates a sectional view of the oxidation exhaust trap of FIG. 2A taken along line 2B—2B.

As discussed above with reference to FIGS. 1A and 1B, the oxidation exhaust trap 200 as illustrated in FIGS. 2A, and 2B can likewise be configured to have the multiple filter configuration shown in FIG. 4, and/or connected in series as shown in FIG. 5.

Figure 3A:
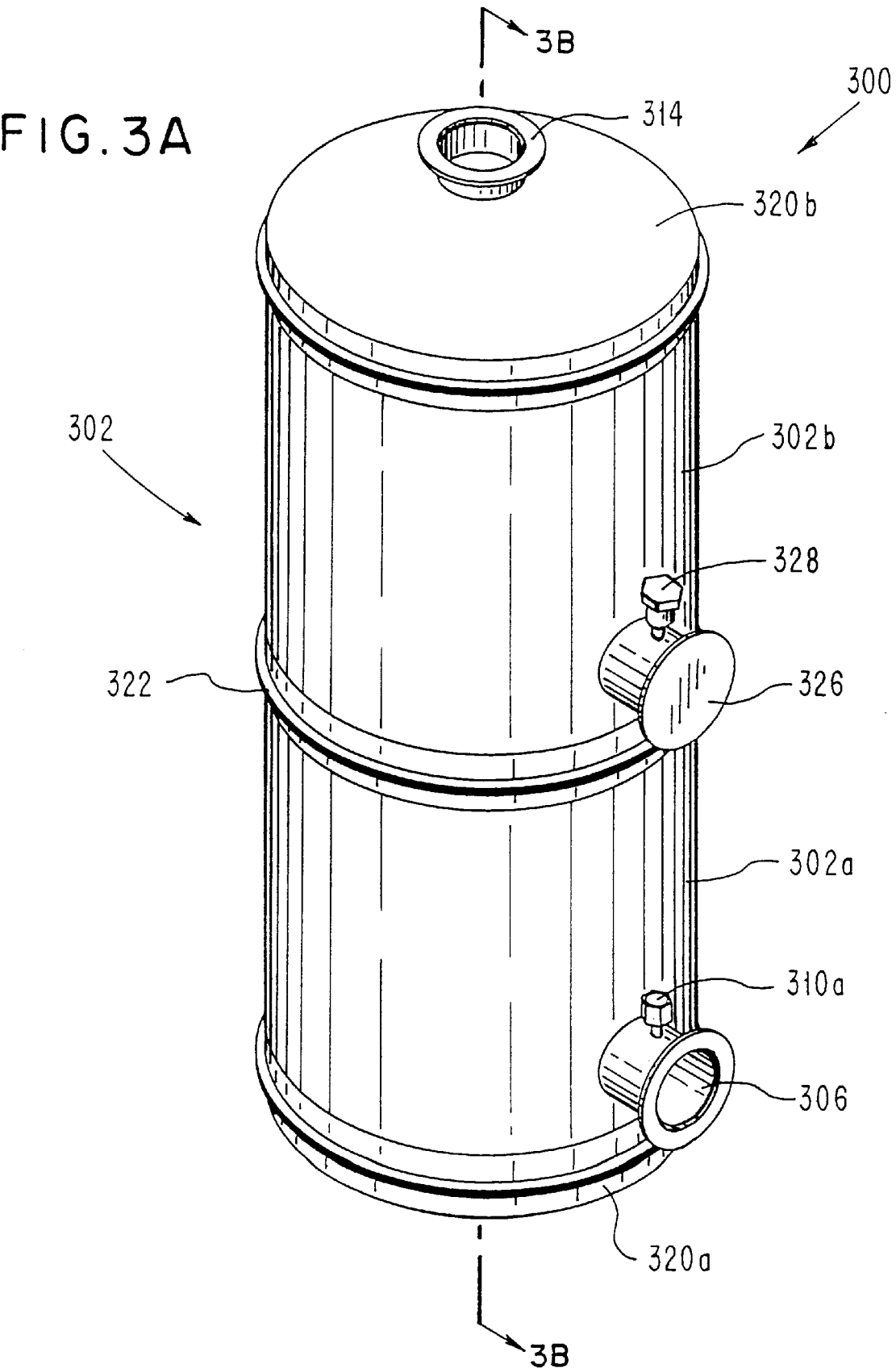
FIG. 3A illustrates an isometric view of yet another alternative version of the oxidation exhaust trap of the present invention.

Referring now to FIGS. 3A and 3B, there is illustrated a variation of the above described embodiment, generally referred to by reference numeral 300. In operation the oxidation exhaust trap 200 shown in FIGS. 2A and 2B is identical to the oxidation exhaust trap 300 of FIGS. 3A and 3B. However, the oxidation exhaust trap 300 makes use of standard fabricated vessels 302a, 302b making up vessel 302. Vessel 302 has inlets 306, 310a, 310b, endcaps 320a, 320b, interior cavities 304, 04a, 304b, first filter element 316a, second filter element 316b, first gas 308 and oxidizing agent 312, and coupling 322. As evidenced by FIGS. 3A and 3B, the prefabricated standard vessels 302a, 302b, are joined by coupling 322 and sealed at each end by endcaps 320a, 320b. The top endcap 320b having an outlet 314 for exhaust of the gaseous product 318 and the bottom endcap 320a having feet 324 for resting on a floor. The inlets 306, 310a, 310b on vessel 302b are not used and are therefore capped using suitable plugs 326, 328, respectively. As discussed above with reference to FIGS. 1A and 1B, the oxidation exhaust trap 300 as illustrated in FIGS. 3A, and 3B can likewise be configured to have the multiple filter configuration shown in FIG. 4, and/or connected in series as shown in FIG. 5.

The operation of the oxidizing exhaust trap 100 will now be described with regard to FIG. 1B. The first gas 108 is introduced into the exhaust trap 100 at the first inlet 106, which in turn introduces the gas into the interior cavity 104. The first gas, generally silane, typically a byproduct of a manufacturing process, is pumped, under pressure, into the exhaust trap 100 from the manufacturing process environment. Simultaneously with the introduction of the first gas 108, an oxidizing agent 112, generally compressed air, is introduced into the interior cavity 104 via the second inlet 110a, and preferably, also through an opposing third inlet 110b. Preferably, the compressed air is introduced into the interior cavity 104 at a pressure of approximately 40 PSI. The first gas 108 and the oxidizing agent 112 mix thereby causing an oxidation of the first gas 108 wherein a particulate product is produced suspended in a gaseous product. The particulate product and gaseous product of the oxidation travels in the direction indicated by arrows A, that is, from the filter's exterior to its center where the particulate product is filtered out. The gaseous product 118, free of any particulate, then travels through the central core(s) of the filter(s) 116 as indicated by arrows B and exhausted through the outlet 114 as indicated by arrow 118.

In the case where multiple stage filters are used in the same vessel, as is the case illustrated in FIG. 2B, less than all of the particulate product is filtered out in the first filter stage 216a. The first gas 208 is introduced into the exhaust trap 200 at the first inlet 206, which in turn introduces the gas into the first part 204a of the interior cavity 204. Simultaneously with the introduction of the first gas 208, an oxidizing agent 212, is introduced into the first part 204a of the interior cavity 204 via the second inlet 210a, and preferably, also through an opposing third inlet 210b. The first gas 208 and the oxidizing agent 212 mix thereby causing an oxidation of the first gas 208 wherein a particulate product is produced suspended in a gaseous product. The particulate product and the gaseous product of the oxidation travel in the direction indicated by arrows A, that is from the first filter's exterior to its center where the particulate product is filtered out. The remaining particulate product and the gaseous product travels as indicated by arrows B to the second part 204b of the interior cavity 204 and then from the exterior of the second filter stage 216b to its central portions as indicated by arrows C where the remaining particulate product is removed from the gaseous product. The gaseous product, free of any particulate, then travels through the central cores of the second stage filters 216b as indicated by arrows D and exhausted through the outlet 214 as indicated by arrow 218. As discussed previously, the operation of the oxidation exhaust trap 300 shown in FIGS. 3A and 3B is identical to that of the oxidation exhaust trap 200 illustrated in FIGS. 2A and 2B.

The oxidation of the first gas, generally silane, with the oxidizing agent, generally compressed air, is preferably carried out at room temperature. Preferably the silane, or other pyrophoric/oxidizable gas, such as phosphine, is first diluted below its lower explosive limit. For silane, nitrogen is used to dilute the silane to a dilution between 1 and 2%, preferably 1.5%. Performing the method of the present invention at around room temperature leads to some very important advantages over the prior art methods. Firstly, the filter material will last longer because it will not be degraded by the higher temperatures of the methods of the prior art. Secondly, no external energy source (i.e., a flame) is needed to initiate the reaction (i.e., the oxidation) as is necessary in the prior art methods.

Although silane and compressed air have been used by way of example to discuss the operation of the exhaust trap 100, any pyrophoric/oxidizable gas and oxidizing agent now known or later developed can be utilized without departing from the scope and spirit of the invention.

Figure 6:
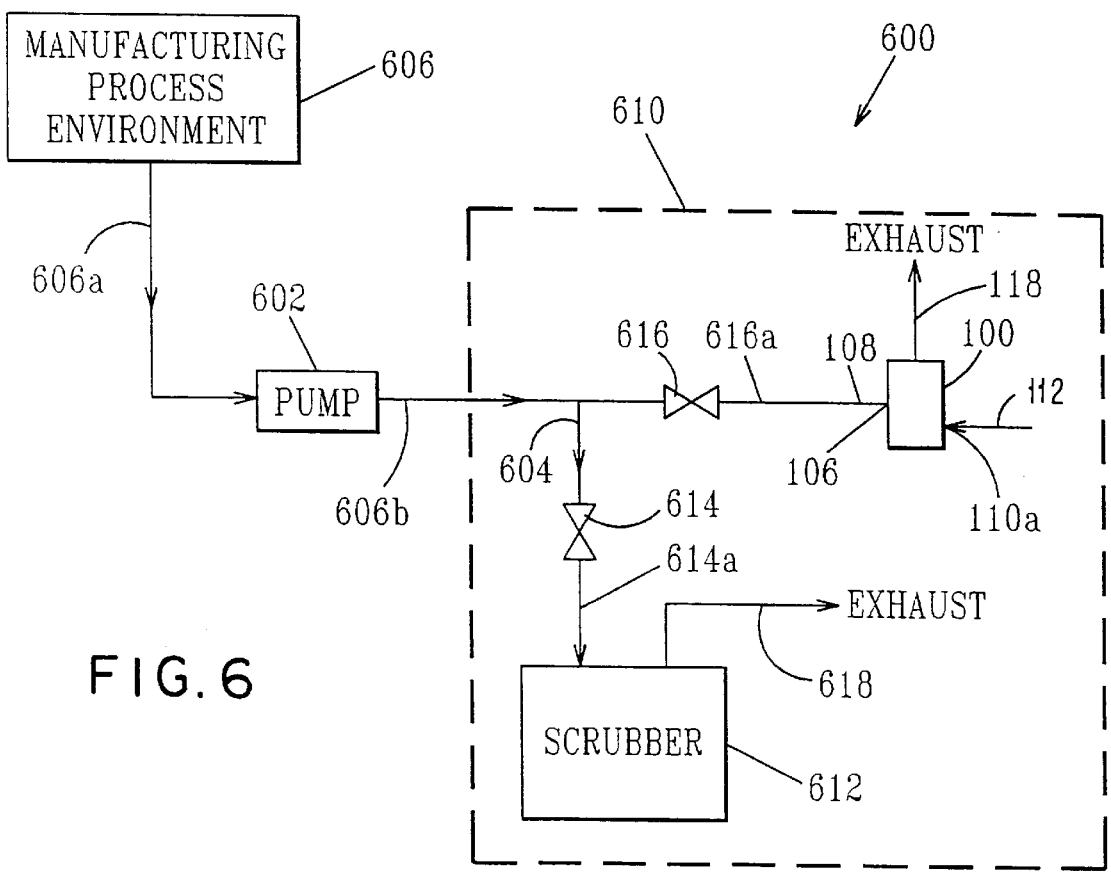
FIG. 6 illustrates a schematic showing a system for filtering a particulate product of a first gas contacted with a gaseous oxidizing agent.

Referring now to FIG. 6, there is illustrated a system for filtering a particulate product of a first gas contacted with a gaseous oxidizing agent in which the oxidation exhaust trap 100 is an element. The system being generally referred to by reference numeral 600. The oxidation exhaust system 600 comprises a pump 602 for removing the first gas 108 and other gases 604, which cannot be oxidized, from a manufacturing process environment 606 and delivering it, through plumbing conduits 606a, 606b to an exhaust subsystem 610. The exhaust subsystem 610 comprises a valving means which directs the gases 108, 604 to their respective destinations, also part of the exhaust subsystem 610. The first gas, generally silane, is directed to the oxidation exhaust trap 100 of the present invention, the other gases 604 are directed to a scrubber 612.

The valving means preferably comprises a first and second valve 614, 616, respectively. When the manufacturing process is producing gases other than oxidizable gases 604 the first valve 614 is opened and the second valve 616 closed. This directs the other gases 604, via plumbing conduits 614a, to the scrubber 612 for processing and eventual exhaust 618. However, when the manufacturing process 606 is producing the first gas 108, the first valve 614 is closed and the second valve 616 opened, which directs the first gas 108, via plumbing conduits 616a, to the oxidation exhaust trap 100 for oxidation, particulate removal, and eventual gaseous product 118 exhaust. Preferably, the valving means is controlled by a valve processing means (not shown), preferably a PLC or personal computer, which automatically switches the valves 614, 616 when the manufacturing process starts to produce a different gas. Also, the first valve 614 is preferably normally open and the second valve is preferably normally closed to ensure that the gases (either 108 or 604) from the manufacturing process 606 are directed to at least the scrubber in the event of a malfunction in the valving means, valving processor, or the oxidation exhaust trap 100.

It should be readily apparent that the valving means can take on a number of different configurations without departing from the scope and spirit of the present invention, such as replacing the first and second valves 614, 616, with a single three-way valve (not shown). In a first position, the three way valve would direct the other gases 604 to the scrubber, and in a second position, the three-way valve would direct the first gas 108 to the oxidation exhaust trap 100. Alternatively, the oxidation exhaust system 600 of FIG. 6 can also be configured having oxidation exhaust traps 200, 300, or 500 as illustrated in FIGS. 2B, 3B, or 5, respectively.

Additionally the system 600 can also comprise a sensor (not shown) for detecting when the filter(s) of the oxidation exhaust trap 100 are clogged with particulate product. This sensor acts as a safeguard against system 600 failure and any manufacturing problems that may result as a consequence of the system 600 failure. Preferably, the sensor is a pressure sensor at the pump 602 which measures the back pressure in the conduits 606a, 616a leading to the oxidation exhaust trap 100, which is also an indication of the pressure in the interior cavity of the oxidation exhaust trap 100. As the filters in the oxidation exhaust trap become clogged with particulate product, the pressure in the interior cavity and in the conduits 606a, 616a rise. Thus the back pressure is a good indication of the amount of particulate matter in the filters and can therefore be used to signify when the filters need to be cleaned or replaced.

Preferably, the sensor is set to issue a warning at a first pressure, at which time the manufacturing process 606 is shut down and the filter(s) of the oxidation exhaust trap 100 changed or replaced. Preferably, the sensor also has a second pressure setting, which prompts the shutdown of the pump before any damage occurs to the system 600. In practice, it has been found that a first setting of 3 PSI provides a good indication of when filter maintenance needs to be performed, and a second setting of 6 PSI being a good failsafe pressure over which the system 600 can be damaged (provided that the exhaust 118 of the oxidation exhaust trap 100 is sufficient to maintain a negative gage pressure in the interior cavity during normal operating conditions).

Due to the inventive filtering arrangement of the present invention, which has been actually reduced to practice in the high volume manufacture of semi-conductor wafers, the advantages offered by the inventive structure resides in its lightweight, its operation at room temperature, and its is inexpensive operation, fabrication and maintenance.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

We claim:

1. An oxidation exhaust trap for filtering a particulate product of a first gas contacted with a gaseous oxidizing agent, the oxidation exhaust trap comprising:

at least one vessel having an interior cavity, a first inlet in communication with the interior cavity for introduction of the first gas into the interior cavity, a second inlet in communication with the interior cavity for introduction of the gaseous oxidizing agent into the interior cavity, the gaseous oxidizing agent mixing with the first gas in an amount effective to cause room temperature oxidation of the first gas producing the particulate product suspended in a gaseous product, the vessel further having an outlet in communication with the interior cavity; and a first filter and a second filter in series with each other, said first filter disposed in the interior cavity for filtering the particulate product from the gaseous product which is exhausted through the outlet, and said second filter having a smaller pore size than said first filter, said at least one vessel does not contain an external energy source to initiate said room temperature oxidation.

2. The oxidation exhaust trap of claim 1, further comprising a third inlet in communication with the interior cavity and opposing the second inlet for also introducing compressed air into the interior cavity to further facilitate its mixing with the first gas.

3. The oxidation exhaust trap of claim 1, wherein the second filter has a pore size of 2 microns for removal of a silica particulate product having a size of 2 microns and larger.

4. The oxidation exhaust trap of claim 1, wherein said at least one vessel comprises a plurality of vessels, the vessels being arranged in series such that the outlets of all but the last vessel act as the first inlet and the second inlets of all but the first vessel are capped, the outlet of the last vessel in the series being for exhaust of the gaseous product, and wherein the filters disposed in the interior cavities of the vessels filter successively smaller particulates from the first to the last vessel.

5. An oxidation exhaust trap for filtering a particulate product of a first gas contacted with a gaseous oxidizing agent, the oxidation exhaust trap comprising:

at least one vessel having an interior cavity, the interior cavity having a first and a second part in communication with each other, a first inlet in communication with the first part of the interior cavity for introduction of the first gas into the first part of the interior cavity, a second inlet in communication with the first part of the interior cavity for introduction of the gaseous oxidizing agent into the first part of the interior cavity, the gaseous oxidizing agent mixing with the first gas in an amount effective to cause room temperature oxidation of the first gas in the first part of the interior cavity producing the particulate product suspended in a gaseous product, the vessel further having an outlet in communication with the second part of the interior cavity;

a first filter disposed in the first part of the interior cavity for filtering the particulate product of a predetermined size from the gaseous product; and a second filter in series with said first filter, said second filter having a smaller pore size than said first filter and being disposed in the second part of the interior cavity for filtering the remaining particulate product from the gaseous product which is exhausted through the outlet, said at least one vessel does not contain an external energy source to initiate said room temperature oxidation.

6. The oxidation exhaust trap of claim 5, further comprising a third inlet in communication with the first part of the interior cavity and opposing the second inlet for also introducing compressed air into the first part of the interior cavity to further facilitate its mixing with the first gas.

7. The oxidation exhaust trap of claim 5, wherein the first filter has a pore size of 50 microns for removal of silica particulates having a size of 50 microns and larger.

8. The oxidation exhaust trap of claim 7, wherein the second filter has a pore size of 2 microns for removal of the remaining silica particulate product having a size between 2 and 50 microns.

9. The oxidation exhaust trap of claim 9, wherein said at least one vessel comprises a plurality of vessels, the vessels being arranged in series such that the outlets of all but the last vessel acts as the first inlet and the second inlets of all but the first vessel are capped, the outlet of the last vessel in the series being for exhaust of the gaseous product, and wherein the first and second filters disposed in the first and second parts of the interior cavities of the vessels filter successively smaller particulates from the first to the last vessel.

10. An oxidation exhaust system comprising;

a pump for removing gaseous byproducts from a manufacturing process environment, the gaseous byproducts being an oxidizable first gas and second non-oxidizable gases;

an oxidation exhaust trap for filtering a particulate product of the first gas contacted with a gaseous oxidizing agent, the oxidation exhaust trap comprising: a vessel having an interior cavity, a first inlet in communication with the interior cavity for introduction of the first gas into the interior cavity, a second inlet in communication with the interior cavity for introduction of the gaseous oxidizing agent into the interior cavity, the gaseous oxidizing agent mixing with the first gas thereby causing oxidation of the first gas for producing the particulate product suspended in a gaseous product, the vessel further having an outlet in communication with the interior cavity; and a first filter and a second filter in series with each other, said first filter disposed in the interior cavity for filtering the particulate product from the gaseous product which is exhausted through the outlet, and said second filter having a smaller pore size than said first filter;

a scrubber for processing the second gases; and a valving means for directing the first gas to the oxidation exhaust trap through first conduits when the manufacturing process is producing the first gas, and for directing the second gases to the scrubber through second conduits when the manufacturing process is producing the second gases, said vessel does not contain an external energy source to initiate oxidation.

11. The oxidation exhaust system of claim 10, wherein the valving means comprises;

a first valve disposed in the first conduits; and
a second valve disposed in the second conduits;
whereby when the first valve is open and the second valve is closed, the first gases are directed to the oxidation exhaust trap, and when the first valve is closed and the second valve open, the second gases are directed to the scrubber.

* * * * *

UNITED STATES PATENT AND TRADEMARK OFFICE
CERTIFICATE OF CORRECTION

PATENT NO. : 6,224,834 B1
DATED : May 1, 2001
INVENTOR(S) : Charles A. Choate et al.

It is certified that error appears in the above-identified patent and that said Letters Patent is hereby corrected as shown below:

Title page,
Item [56], References Cited, OTHER PUBLICATIONS, "carbone" should read -- Carbone --

Column 8,
Line 33, "claim 9" should read -- claim 8 --

Signed and Sealed this

Eighth Day of January, 2002

*Attest:*

JAMES E. ROGAN
*Director of the United States Patent and Trademark Office*

*Attesting Officer*